Figure 1:
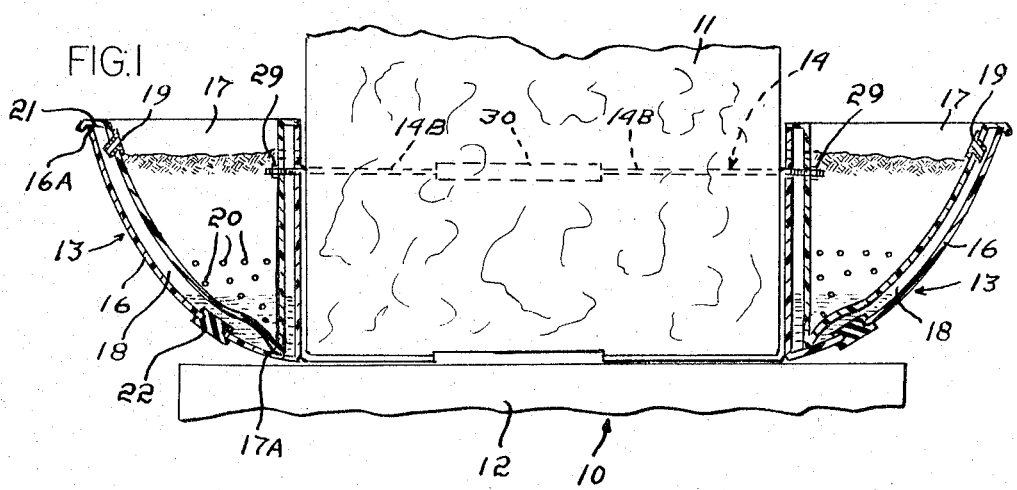

Feb. 7, 1967  J. R. MacDONALD ETAL  3,302,324
FLORAL DISPLAY DEVICE FOR ATTACHMENT TO A CEMETERY MONUMENT
Filed Sept. 4, 1964  2 Sheets-Sheet 1

INVENTORS:
JOSEPH R. MAC DONALD
WINFRED A. MAC DONALD
BY,
*Abbott Spear,*
ATTORNEY Feb. 7, 1967   J. R. MacDONALD ETAL   3,302,324
FLORAL DISPLAY DEVICE FOR ATTACHMENT TO A CEMETERY MONUMENT
Filed Sept. 4, 1964   2 Sheets-Sheet 2
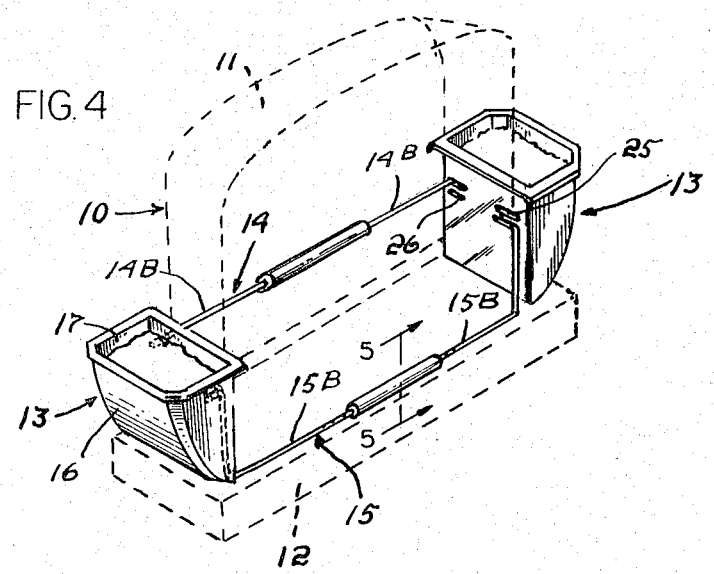
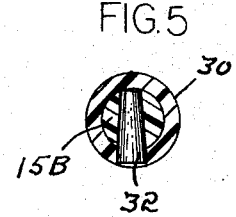
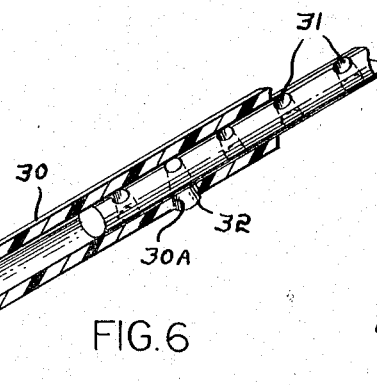
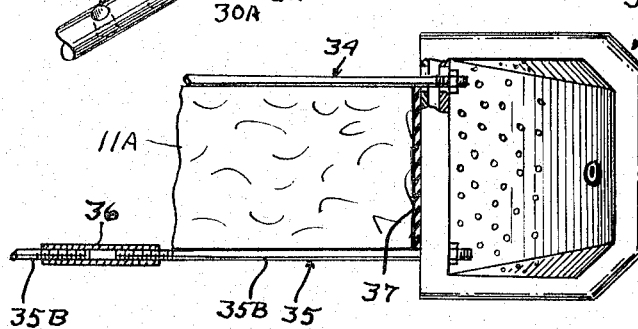
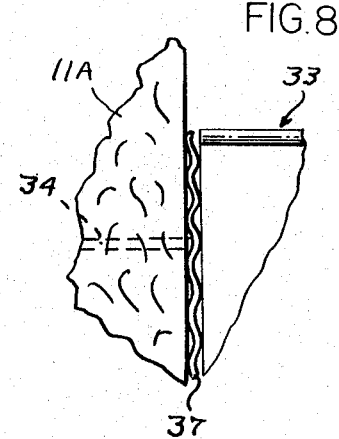
INVENTORS
JOSEPH R. MAC DONALD
WINFRED A. MAC DONALD
BY,
*Abbot Spear*
ATTORNEY

United States Patent Office 3,302,324
Patented Feb. 7, 1967

3,302,324
FLORAL DISPLAY DEVICE FOR ATTACHMENT
TO A CEMETERY MONUMENT
Joseph R. MacDonald, 63 Franklin St., Winchester, Mass. 01890, and Winfred A. MacDonald, 3 Loraine Road, Medford, Mass. 02155
Filed Sept. 4, 1964, Ser. No. 394,449
11 Claims. (Cl. 47—34)

The present invention relates to floral display devices for attachment to cemetery monuments.

While graves receive varying amounts of attention, some floral decoration is almost always added to each at one time or another, the flowers usually being placed close to the headstone. In an increasing number of cemeteries, however, floral displays are regulated because of such reasons as that they often interfere with the mowing of the grass, that the dead flowers and plants were not seasonally removed, and that the containers themselves detract from the appearance of the cementery.

As a consequence of regulations directed against the use of displays that interfered with mowing, it has become fairly common practice to attach containers to the headstones. Cemetery monuments are now most commonly of the type including a headstone portion of an approximately rectangular cross sectional shape and a ground-entering or apron portion projecting marginally of the headstone portion. A container positioned on the apron portion is thus out of the path of a lawn mower but as the aprons are relatively narrow, a container must be held in place by a connection with the monument. For that reason, usually two containers are used, one for each of two opposite faces of the headstone, usually its ends, and these are interconnected by means extending lengthwise of its other two opposite faces.

Such devices, while ensuring that the displays do not interfere with grass mowing, fail to meet two important requirements. One of these is the matter of appearance, partly design, including both shape and color, and partly structural features, particularly the connections between the headstone portion and the container or containers.

In addition, such devices fail to suitably facilitate care when the containers are for plants rather than either cut or artificial flowers. While the life of cut flowers is unavoidably short, plants are widely used because, with proper care, they afford a graveside tribute throughout the growing season. Except in the relatively uncommon situation where a cemetery can be visited for the needed regular watering, plants die prematurely due to lack of care and by themselves and apart from their containers, create an objectionable appearance.

A principal objective of the present invention is to provide floral display devices, each consisting of a plurality of members one for each face of a headstone portion that is rectangular in cross section, the members being interconnected to establish a frame with at least one and usually both members of one pair being containers and with the frame adjustable in length or width and usually as to both dimensions. A particular object of the invention is to form the devices of plastics that are available in a number of monument matching colors and that are both non-staining and resistant to weathering.

Another principal objective of the invention is to have each device include, instead of a single container such as might be used with cut flowers, a unit that includes a pair of containers, one within the other and spaced therefrom to provide a reservoir and with the inner container having irrigating apertures in its lower part, the reservoir being adapted to contain material capable of absorbing water containing nutrients for the plants thereby enabling the plants to be safely left unattended for long periods of time.

In the accompanying drawings there are shown illustrative embodiments of the invention from which these and other of its objectives, novel features, and advantages of the invention will be readily apparent.

Figure 2:
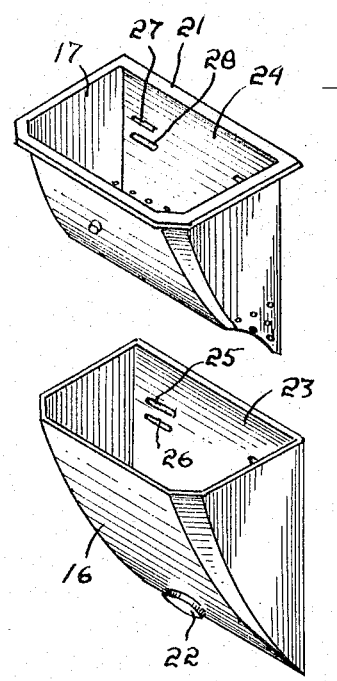
Figure 3:
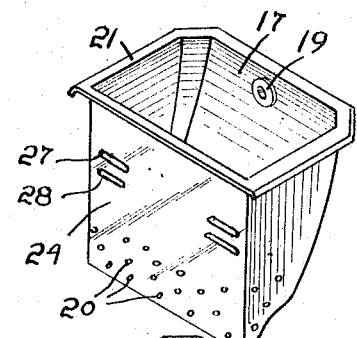
Figure 3:
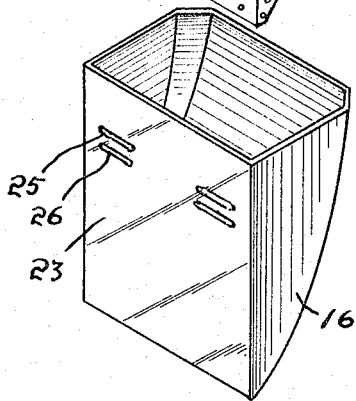

In the drawings:

FIGURE 1 is a fragmentary and partly sectioned front view of a display device in accordance with the invention attached to a cemetery monument, FIGURE 2 is a perspective view of the outer portions of the containers of a unit with the inner container removed from the outer container, FIGURE 3 is a like view but showing the inner portions of two containers of a unit, FIGURE 4 is a perspective view of the device when installed on an indicated cemetery monument, FIGURE 5 is a section, on an enlarged scale, taken along the indicated lines 5—5 of FIGURE 4, FIGURE 6 is a fragmentary perspective view of one of the connecting members, FIGURE 7 is a fragmentary and partly sectioned top plan view of a display device in accordance with another embodiment of the invention, and FIGURE 8 is a fragmentary side view thereof.

A cemetery monument, generally indicated at 10, is shown as of the type having a headstone portion 11 that is rectangular in cross section and a marginally projecting base or apron portion 12. A device in accordance with the embodiment of the invention illustrated by FIGURES 1–6 comprises a plurality of members, one for each face of the headstone portion 11 and interconnected about it to provide a frame including two opposite members in the form of generally indicated container units 13 shown as engaging the apron portion 12 and two opposite members interconnecting the units 13 and generally indicated at 14 and 15.

Each unit 13 consists of an outer container 16 and an inner container 17 of approximately the same shape but dimensioned to so fit the former as to establish a reservoir 18, the upper part of the inner container having a filler port 19 and its lower part having a series of apertures 20 placing its interior in communication with the reservoir 18, see FIGURE 1. The container 17 is also shown as having a marginal flange 21 overlying the reservoir 18 and supported by the upper edge 16A of the container 16 and as having a bottom portion 17A seated against the bottom of the outer container 16 near its removable drain plug 22.

While the shape of the containers 16 and 17 is largely a matter of design, the wall 23 of the container 16 that is to abut an end of the monument portion 11 is planar as is the corresponding wall 24 of the container 17. The length of the containers 16 and 17 is greater than the thickness of the headstone portion 11 and the wall 23 has, adjacent each side, a pair of vertically spaced transverse slots 25 and 26 which register with corresponding slots 27 and 28 with which the wall 24 is provided. With this arrangement, with headstone portions whose thickness is within predetermined limits, some portion of each slot is exposed to receive the threaded ends of the connecting members 14 and 15, respectively, the units being secured by anchoring nuts 29 threaded thereon.

The member 14 extends transversely of the rear face of the headstone portion 11 while the member 15 is U-shaped so that it extends transversely of the front face thereof in the zone of the junction between the headstone portion 11 and the apron portion 12 thus avoiding any interference with the inscription. The members 14 and 15 are shown as of rod stock and as consisting of a pair of sections, 14B and and 15B, respectively, whose proximate ends are slidably entrant of a sleeve 30 and have a series of longitudinally spaced transverse bores 31, each adapted to register with an appropriate one of the end bores 30A of the sleeve 30 and to receive a locking pin 32 thus permitting the length of the connecting members to be adjusted.

In the embodiment of the invention illustrated by FIGURES 7 and 8, the frame surrounding the headstone 11A is shown as including container units 33 that may be identical to those just described and interconnected by members 34 and 35. The members 34 and 35 are similar to the members 14 and 15 but have their sections 34B and 25B, respectively, appropriately threaded and with an appropriately threaded sleeve 36 thus providing a turnbuckle enabling the units 33 to be clamped tightly against seats 37 which may be a corrugated body of rubber or an artificial rubber. In this embodiment, the device may be securely locked in place without contact with the apron 12A.

While the devices may be made of other materials, it is preferred that they be made from any suitable plastic that is non-staining, capable of weathering a sufficiently wide range of temperature extremes, and available in colors closely matching typical monument coloring.

In use, the devices are easily assembled and adjusted as a close-fitting frame about the headstone portion of a monument and a plant is then set in the container 17 with the soil preferably covering the nuts 29, thus making theft less easy. It is preferred that absorbent or adsorbent material be placed in the reservoirs as well as plant nutrients.

We claim:

1. A device for attachment to a cemetery monument of the type having a headstone portion of rectangular cross section, said device comprising a plurality of members, one for each face of said headstone portion, said members being interconnected about said headstone to establish a frame, at least one member being a container, the members connected thereto being adjustable lengthwise of the faces proximate thereto, and a resilient anchor disposed between the container member and the face to the headstone proximate thereto and at least partially compressed by adjustments of the frame.

2. The device of claim 1 in which the anchor is corrugated.

3. A device for attachment to a cemetery monument of the type having a headstone portion of rectangular cross section, said device comprising a plurality of members, one for each face of said headstone portion, said members being interconnected about said headstone portion, said members being interconnected about said headstone to establish a frame, one pair of opposite members being containers, said containers having transverse slots through which the ends of the other pairs of members extend, the length of the slots being such as to enable the frame to be adjusted to fit headstone portions the length of the faces of which that correspond to the faces engaged by the container members being within a predetermined range.

4. The device of claim 3 in which the containers have a plurality of vertically spaced transverse slots.

5. A device for attachment to a cemetery monument of the type having a headstone portion of rectangular cross section and a base portion, said device comprising a plurality of members, one for each face of said headstone portion, said members being interconnected about said headstone to establish a frame, one pair of opposite members being containers, one of the other pair of opposite members extending transversely of the proximate face of the headstone portion above the junction between the monument portions and the other including a U-shaped section whose central part is approximately equal to the length of the proximate face of said headstone portion and is disposed in the zone of said junction.

6. A device for attachment to a cemetery monument of the type having a headstone portion of rectangular cross section, said device including a pair of units, one for each of two opposite faces of said headstone portion, each unit comprising a pair of containers, one being for a plant and positioned within the other and spaced therefrom to provide a reservoir, the inner container having irrigating apertures in its lower part, and means extending lengthwise of the other two opposite faces of the headstone portion and interconnecting said units.

7. A device for attachment to a cemetery monument of the type having a headstone portion of rectangular cross section, said device including a pair of units, one for each of two opposite faces of said headstone portion, each unit comprising a pair of containers, one being for a plant and positioned within the other and spaced therefrom to provide a reservoir, the inner container having irrigating apertures in its lower part, and means extending lengthwise of the other two opposite faces of the headstone portion and interconnecting said units, said means extending through the proximate walls of the containers of both units and including a detachable connection, the dirt level in each inner container being above said connection.

8. A device for attachment to a cemetery monument of the type having a headstone portion of rectangular cross section, said device including a pair of units, one for each of two opposite faces of said headstone portion, each unit comprising a pair of containers, one being for a plant and positioned within the other and spaced therefrom to provide a reservoir, each of said inner containers having irrigating apertures in its lower part and provided with an external flange in its upper part overlying and being supported by the upper edge of the outer container, and means extending lengthwise of the other two opposite faces of the headstone portion and interconnecting said units.

9. A device for attahcment to a cemetery monument of the type having a headstone portion of rectangular cross section, said device including a pair of units, one for each of two opposite faces of said headstone portion, each unit comprising a pair of containers, one being for a plant and positioned within the other and including supporting portions engageable with the bottom of the outer container to provide a space between the containers that may be used as a reservoir, said inner container having irrigating apertures in its lower part, and means extending lengthwise of the other two opposite faces of the headstone portion and interconnecting said units.

10. A device for attachment to a cemetery monument of the type having a headstone portion of rectangular cross section, said device including a pair of units, one for each of two opposite faces of said headstone portion, each unit comprising a pair of containers, one being for a plant and positioned within the other and spaced therefrom to provide a reservoir, said container including transversely extending slots, the inner container having irrigating apertures in its lower part, and means extending lengthwise of the other two opposite faces of the headstone portion and interconnecting said units through alined container slots.

11. A device for attachment to a cemetery monument of the type having a headstone portion of rectangular cross section, said device comprising a plurality of members, one for each face of said headstone portion, said members being interconnected about said headstone portion to establish a frame, one pair of members being display units including a pair of containers, one being for a plant and positioned with the other and spaced therefrom to provide a reservoir, the inner container having irrigating apertures in its lower part, the containers of each unit having transverse slots through which the ends of the other pair of members extends, the length of the slots being such as to make the frame adjustable to a range of sizes of headstone portions, and means locking said members together within each inner container.

References Cited by the Examiner

UNITED STATES PATENTS

| | | | |
|---|---|---|---|
| 2,640,307 | 6/1953 | Robertson | 172—441 |
| 2,646,657 | 7/1953 | Robertson | 172—441 |
| 3,145,847 | 8/1964 | Clement | 211—71 |
| 3,164,343 | 1/1965 | Cucullo | 248—221 X |
| 3,165,863 | 1/1965 | Duran | 47—47 |

FOREIGN PATENTS 409,535  4/1910  France.

ABRAHAM G. STONE, *Primary Examiner.*

J. R. OAKS, *Assistant Examiner.*